(12) United States Patent
Parlow et al.

(10) Patent No.: US 11,529,718 B2
(45) Date of Patent: Dec. 20, 2022

(54) METHOD AND DEVICE FOR TIGHTENING SCREW JOINTS

(71) Applicant: Liebherr-Components Biberach GmbH, Biberach an der Riss (DE)

(72) Inventors: Jan Parlow, Uttenweiler (DE); Ilaka Mupende, Neu-Ulm (DE); Peter Barton, Bretten (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 522 days.

(21) Appl. No.: 16/493,669

(22) PCT Filed: Mar. 13, 2018

(86) PCT No.: PCT/EP2018/056152
§ 371 (c)(1),
(2) Date: Sep. 12, 2019

(87) PCT Pub. No.: WO2018/167008
PCT Pub. Date: Sep. 20, 2018

(65) Prior Publication Data
US 2020/0130152 A1    Apr. 30, 2020

(30) Foreign Application Priority Data

Mar. 13, 2017  (DE) ..................... 10 2017 002 440.5

(51) Int. Cl.
*B25B 23/14* (2006.01)
*B25B 21/00* (2006.01)
(Continued)

(52) U.S. Cl.
CPC .............. *B25B 23/14* (2013.01); *B25B 21/00* (2013.01); *B23P 19/066* (2013.01); *B25B 23/145* (2013.01); *B25B 23/147* (2013.01)

(58) Field of Classification Search
CPC ... B25B 23/14; B25B 23/1405; B25B 23/141; B25B 23/142; B25B 23/1422;
(Continued)

(56) References Cited

U.S. PATENT DOCUMENTS 3,982,419 A * 9/1976 Boys ........................ G01N 3/22
73/764
4,333,220 A * 6/1982 Aspers .................... B25B 23/14
29/240
(Continued)

FOREIGN PATENT DOCUMENTS

CN    101062555     10/2007
DE      1703681 A1   3/1972
(Continued)

OTHER PUBLICATIONS

German Search Report issued in DE 10 2017 002 440.5 dated Feb. 20, 2018.
(Continued)

*Primary Examiner* — Robert J Scruggs
(74) *Attorney, Agent, or Firm* — Troutman Pepper Hamilton Sanders LLP; Ryan A. Schneider

(57) ABSTRACT

A method and apparatus for tightening a screw connection having a motor-operated screwdriver unit, wherein the angle of rotation and the torque are determined during the tightening to be able to stop the tightening process on reaching a desired tightening tension. An increase in the torque over the angle of rotation is determined by a determination device in a first tightening region and a change in the increase in the torque over the angle of rotation is determined in a second, following tightening region, with the screwdriver unit being stopped by a control device on reaching or exceeding of a maximum permitted change in the increase and/or of a
(Continued)

change speed that is determined with reference to the increase that occurred in the first tightening region.

17 Claims, 1 Drawing Sheet

(51) Int. Cl.
*B23P 19/06* (2006.01)
*B25B 23/145* (2006.01)
*B25B 23/147* (2006.01)

(58) Field of Classification Search
CPC ............ B25B 23/1425; B25B 23/1427; B25B 23/145; B25B 23/1456; B25B 23/147; B25B 21/00; B25B 21/002; B23P 19/065; B23P 19/066
See application file for complete search history.

(56) References Cited

U.S. PATENT DOCUMENTS

| | | | | |
|---|---|---|---|---|
| 4,685,050 | A * | 8/1987 | Polzer | B25B 23/14 173/183 |
| 4,833,220 | A * | 5/1989 | Frey | C04B 35/571 528/33 |
| 4,969,105 | A * | 11/1990 | Gaenssle | B25B 23/14 700/275 |
| 5,229,931 | A * | 7/1993 | Takeshima | G05B 19/0421 700/169 |
| 5,315,501 | A * | 5/1994 | Whitehouse | B23P 19/066 173/176 |
| 5,637,968 | A * | 6/1997 | Kainec | B25B 23/14 318/432 |
| 7,743,673 | B2 * | 6/2010 | Wagner | B25B 23/145 73/862.23 |
| 9,032,602 | B2 * | 5/2015 | Woods | F16B 19/1072 29/407.03 |
| 2010/0059240 | A1 * | 3/2010 | Schmidt | B25B 21/00 173/1 |
| 2013/0047799 | A1 * | 2/2013 | Gareis | B25B 17/02 81/467 |
| 2016/0288304 | A1 * | 10/2016 | Shiao | B25B 23/1425 |

FOREIGN PATENT DOCUMENTS

| | | |
|---|---|---|
| DE | 2336896 | * 1/1974 |
| DE | 2336896 A1 | 1/1974 |
| DE | 3143350 A1 | 5/1983 |
| DE | 3422522 A1 | 12/1985 |
| DE | 4024577 A1 | 2/1992 |
| DE | 19845871 A1 | 4/1999 |
| DE | 102004053288 A1 | 5/2006 |
| DE | 102005019258 A1 | 11/2006 |
| DE | 102007048187 A1 | 4/2009 |
| EP | 0264034 A2 | 4/1988 |
| EP | 0559937 A1 | 9/1993 |
| EP | 2397258 | * 12/2011 |

OTHER PUBLICATIONS

International Search Report issued in PCT/EP2018/056152 dated Jul. 2, 2018.
Office Action from CN Application No. 2018800183263 dated Nov. 30, 2020 (17 pages w/eight pages of English translation).
Office Action from CN Application No. CN201880018326.3 dated Jun. 8, 2021.

* cited by examiner

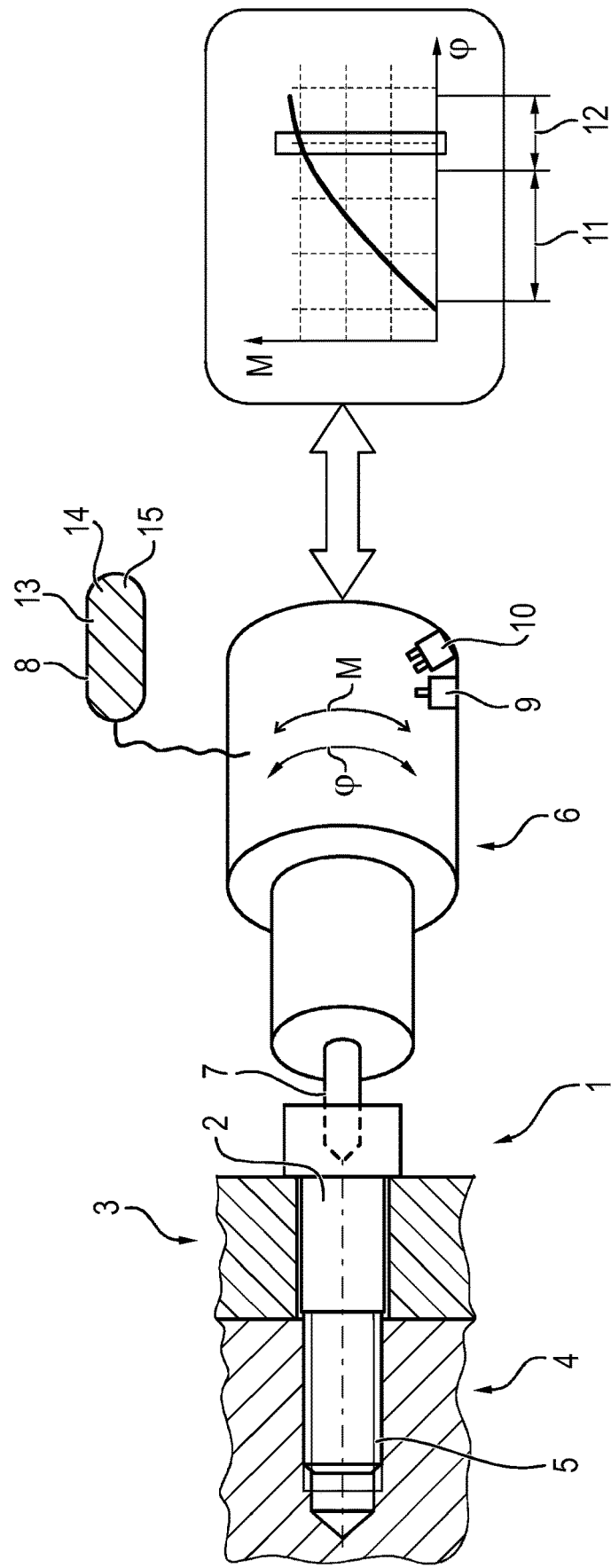

METHOD AND DEVICE FOR TIGHTENING SCREW JOINTS

The present invention relates to a method and to an apparatus for tightening a screw connection with a motor-operated screwdriver unit, wherein the angle of rotation and the torque are determined during the tightening to be able to stop the tightening process on reaching a desired tightening tension.

Two elements are typically connected to one another by means of screw connections, with such a screw connection being able to comprise a bolt passing through the plurality of elements onto which a screw nut is screwed. Alternatively, such screw connections can also be implemented by screws that are screwed into a thread that is provided in one of the elements, either in a blind hole or in a clearance hole. To connect the two elements to be connected to one another with the required preload and also to reliably avoid a releasing of the screw connection, but to avoid an overtight tightening with the risk of damage to the screw thread, on the other hand, the screw connections should be tightened exactly so much where possible that the desired preload force or a permitted corridor for it is neither fallen below nor exceeded.

It has therefore already been proposed in the prior art to carry out the tightening of screw connections in a torque-controlled manner or in a manner controlled by the angle of rotation. A suitable sensor here monitors the torque applied by the motor-driven screwdriver unit so that the tightening process can be stopped on reaching a predetermined torque. Alternatively, a rotary encoder monitors the angle of rotation during tightening to stop after a specific number of tightening revolutions. EP 2 067 576 A2, for example, proposes a screwdriver unit in which the torque is first monitored to determine the reference value or the starting position for the monitoring of the angle of rotation than then continues to take place. If a predetermined, initial tightening torque has been reached, the angle of rotation measurement is initialized or so-to-say set to zero to screw a predetermined angle of rotation from there onward and then to switch off.

Such torque-controlled tightening processes or tightening processes controlled by the angle of rotation, however, require a suitable specification of a threshold for the torque or a threshold for the angle of rotation that naturally vary with different screw connection geometries and materials. To simplify the setting of the thresholds for the torque or for the angle of rotation, it has already been proposed to parameterize the control of the motor driven screwdriver so that the torque values or angle of rotation values no longer have to be specified, but rather characteristic values of the screw connection to be carried out such as the screw connection geometry, the bolt thickness, the friction pairing coefficient, or the material pairing can be input. The two central characteristic process values of angle of rotation and torque are then determined using a calculation model using the respective parameters and are then taken into account as thresholds by the control of the motor driven screwdriver when tightening a screw connection Such parameterizable calculation models are, however, not very simple to prepare and are still susceptible to error. On the one hand, various trials on real elements are typically necessary to ensure the resulting screw connection result or to adapt the parameters and model algorithms such that the actually achieved screw connection result corresponds to the desired screw connection result. On the other hand, errors in the screw connection result can occur due to incorrect inputs of parameters that are not correct for the screw connection to be carried out.

It is the underlying object of the present invention to provide an improved method and an improved apparatus for tightening screw connections which avoid disadvantages of the prior art and further develop the latter in an advantageous manner. A simple operability not susceptible to error should in particular be made possible and simultaneously a tensioning of the screw connection to the desired amount that is as exact as possible should be achieved for different screw connection types.

In accordance with the invention, said object is achieved by a method in accordance with claim 1 and by an apparatus in accordance with claim 4. Preferred embodiments of the invention are the subject of the dependent claims.

It is therefore proposed to evaluate the process parameters of torque and angle of rotation that occur on the tightening of a respective screw connection synchronously with the process and to draw conclusions therefrom on changes in the physical properties of the screw connection and to determine the shutdown criterion therefrom such that the screw connection reaches the desired preload. The shutdown is controlled so-to-say online or on the job using real process parameters that become apparent in the respective screw connection. Provision is made in accordance with the invention that an increase in the torque is determined by a determination device over the angle of rotation in a first tightening region and a change in the increase in the torque over the angle of rotation is determined in a second, following tightening region, with the screwdriver unit being stopped by a control device on reaching or exceeding of a maximum permitted change in the increase and/or of a change speed that is determined with reference to the increase that occurred in the first tightening region.

The teaching in accordance with the invention starts from the consideration that the torque/angle of rotation curve that occurs during tightening can differ from screw connection to screw connection, but respectively follows a specific pattern. The torque/angle of rotation curve will in particular show a specific gradient or a specific increase in an initial, elastic region and will not show any or will only show small changes in the gradient, whereas the gradient of the torque/angle of rotation curve shows considerably greater changes in a region of greater tightening in which the bolt approaches or reaches or even exceeds its yield point. If now the gradient of the torque/angle of rotation curve that respectively appears is detected or determined in the elastic region, the further curve development can be predicted in a manner specific to the screw connection or a shutdown criterion can be derived in a manner specific to the screw connection that can then stop the tightening process exactly when the screw connection has the desired preload. The shutdown criterion is automatically adapted to the individual properties of the screw connection in that the process parameters of torque and angle of rotation that appear during the tightening are evaluated synchronously with the process to determine the shutdown criterion with reference to the torque increase over the angle of rotation that appears and with reference to its change rate.

In a further development of the invention, the aforesaid first tightening region in which the torque increase over the angle of rotation specific to the screw connection is determined can be selected such that the screw connection shows an elastic deformation or stretching, which can be fixed, for example, with reference to the torque amount and/or to the torque increase over the angle of rotation. Starting from an initial loose turning, a first greater increase can, for example, be evaluated as the elastic region in which the toque increase is then determined in a manner specific to the screw connection. The second tightening region in which then the change of the torque increase over the angle of rotation is monitored for a reaching or an exceeding of a maximum value can directly follow the first increase region and/or can also overlap therewith. The first tightening region in which the torque increase is determined can, for example, so-to-say continue to be tightened and can be observed for an ever longer period, while simultaneously the change of the torque increase is already being monitored.

The maximum permitted change for the torque increase over the angle of rotation can in particular be fixed such that the screw connection has reached its yield point or such that the screw connection is preloaded to its yield point. On reaching the yield point, the torque increase over the angle of rotation, i.e. the gradient of the torque/angle of rotation curve, shows a characteristic change so that the reaching of the yield point can be precisely determined by fixing a maximum permitted change of the torque increase with reference to the increase respectively appearing in the initial elastic region. If the determined maximum permitted change of the torque increase has been reached, the motor-powered screwdriver can be stopped, with the screw connection then being preloaded up to the yield point.

The determination of the threshold criterion for the slope gradient of the torque/angle of rotation curve can, however, not only be determined with reference to the torque values and angle of rotation values occurring in the respective tightening and evaluated synchronously with the process, but can also be fixed while taking account of the torque/screwing angle curves of previous tightening processes and screw connections. The torque/angle of rotation developments that result on the tightening of different screw connections and/or threshold criteria derived therefrom for the slope gradient for the shutdown of the tightening process can in particular be stored in a memory and/or in a database so that the threshold criterion for the shutting down of a current tightening process to be carried out can take place while taking account of the stored data. For example, an average threshold value or the last threshold value can be used at least initially in a tightening process to be carried out as the threshold criterion for the permitted change in the torque increase, with then a correction or adaptation being able to take place when a greater difference from the data record forming the basis for the initially underlying threshold criterion appears on the detection of the increase in the torque over the angle of rotation in the current tightening process.

In an advantageous further development of the invention of the invention, the screwdriver unit can also be operated in a mode of operation in which the screw connection is not tightened up to the reaching of the yield point, but is rather stopped beforehand. The screwdriver unit can, for example, be operated in one or more trial runs in which the resulting torque/angle of rotation developments are determined and recorded and are compared with the reaching of the yield point to then fix the shutdown criterion such that the tightening process is stopped before reaching the yield point. An evaluation device can, for example, examine the torque/angle of rotation curve obtained in the trial run as to where the yield point was reached to then determine a torque value and/or an angle of rotation value and/or a specific slope gradient of the torque/angle of rotation curve and/or a specific change value for the torque increase over the angle of rotation as the shutdown criterion on whose reaching a shutdown then takes place in the next serial run or runs.

The determination device that evaluates the process parameters of torque and angle of rotation and their developments can be an integral element of the screwdriver unit and/or of its control device. Alternatively or additionally, a determination device and/or evaluation device external to the unit can be provided, for example in the form of a connectable PC or tablet that can evaluate the torque values and the angle of rotation values.

Said process parameters of torque and angle of rotation can be detected directly at the screwdriver unit by suitable torque sensors and angle of rotation sensors. Alternatively or additionally, said process parameters can, however, also be indirectly determined, for example by detection of the power consumption of the screwdriver drive. With an electric screwdriver motor, for example, the motor voltage and/or the motor current can be measured and can be used as a measure for the torque. If a hydraulic screwdriver drive is used, the pressure and/or the volume flow of the hydraulic drive can be measured, with the determination of the torque/angle of rotation curve being able to take place, for example, with reference to the pressure/volume flow gradient.

The invention will be explained in more detail in the following with reference to a preferred embodiment and to an associated drawing. There are shown in the drawing:

FIG. 1: a schematic, partially sectioned representation of a screw connection and of a screwdriver unit mounted thereat for tightening the screw connection and of a torque/angle of rotation diagram resulting on the tightening.

As FIG. 1 shows, the screw connection 1 can comprise a screw 2 by means of which a first element 3 is fastened to a second element 4, with the screw 2 being able to be screwed, for example, into a thread 5 in the second element 4 so that the head of the screw 2 tensions the first element 3 on the second element 4.

The motor-driven screwdriver unit 6 can be a manually held device or also a device that is held, for example, by a robot and can comprise a screwdriver drive that can comprise an electric motor and/or a pressure-medium motor such as a hydraulic motor or a pneumatic motor.

Said screwdriver drive drives a screwdriver tool 7 by means of which the screw connection 1 can be rotationally tightened.

A determination device 8 for determining the torque M occurring during tightening and the angle of rotation y that occurs in this process can, for example, comprise a torque sensor 9 and an angle of rotation sensor 10, with said process values however, also being able to be detected indirectly, as explained above.

During the tightening of the screw connection 1, the torque development of the torque M over the angle of rotation $\varphi$ shown in the diagram at the right in FIG. 1 results. As FIG. 1 shows, the tightening process starts so-to-say in a torque-free manner, i.e. the screw 2 can initially be turned without any real resistance until the head of the screw reaches the element 3 and the latter contacts the second element 4.

After this initially more or less resistance-free screwing, a first, elastic tightening region 11 results in which the torque M over the angle of rotation $\varphi$ increases at an at least approximately constant rate of increase. In this elastic tightening region 11, the torque/angle of rotation curve shows an approximately constant or only slightly changing increase, cf. FIG. 1.

In a second tightening region 12 which follows the first tightening region 11 and in which the screw connection 11 has reached or is approaching its yield point, said torque/angle of rotation curve shows an increasing rate of change. As FIG. 1 shows, the curve becomes shallower and no longer rises so steeply, i.e. the increase in the torque over the angle of rotation changes more.

Said determination unit 8 comprises a connectable evaluation unit 13 that is internal or external to the device, that evaluates the torque values and angle of rotation values detected during the tightening process, and that determines the increase of the torque/angle of rotation curve shown in FIG. 1.

The evaluation unit 13 can fix a maximum permitted change for the torque increase over the angle of rotation using the torque increase over the angle of rotation that is adopted in the first, elastic tightening region 11, for example to the effect that it is fixed as the threshold criterion that the screwdriver drive is stopped when the torque increase over the angle of rotation 10 only amounts to 75% of the torque increase over the angle of rotation in said first elastic tightening range 11.

Alternatively or in addition to the absolute change in the increase, the speed of change can also be used as a shutdown criterion. A maximum permitted speed of change, that is, a torque change per angle of rotation unit, can in particular be fixed from the rather sluggish change extent in the first elastic region 11 and the tightening process is stopped when said maximum permitted speed of change is reached or exceeded.

A control device 14 can stop the screwdriver drive of the screwdriver unit 6 as soon as said maximum permitted change and/or speed of change of the torque increase over the angle of rotation is reached.

The invention claimed is:

1. An apparatus for tightening a screw connection comprising:
   a motor-driven screwdriver unit;
   determination means for determining the torque (M) and the angle of rotation (φ) during the tightening of the screw connection;
   a determination device:
      for determining in a first tightening region, one or both of:
         an increase of the torque (M) over the angle of rotation (φ); and
         a change of the torque (M) increase over the angle of rotation (φ); and
      for determining:
         if the increase of the torque over the angle of rotation is determined, a change of the increase in the torque over the angle of rotation; and
         if the chance of the torque increase over the angle of rotation is determined, a change speed of the increase of the torque over the angle of rotation;
   an evaluation unit for fixing:
      if the change of the increase in the torque over the angle of rotation is determined, a maximum permitted change of the increase of the torque; and
      if the change speed of the increase of the torque over the angle of rotation is determined, a maximum permitted change speed of the increase of the torque; and
   a control device to, if the maximum permitted chance speed of the increase of the torque is fixed, stop the screwdriver unit on reaching and/or exceeding the maximum permitted change speed of the increase of the torque;
   wherein the first tightening region is fixed with reference to one or more of:
      a torque amount;
      if determined, the increase of the torque over the angle of rotation; and
      if determined, the change of the torque increase over the angle of rotation;
   as an elastic tightening region in which the screw connection is elastically deformed.

2. The apparatus in accordance with claim 1, wherein the determination means comprises a torque sensor and one or both of an angle of rotation sensor and a power consumption measurement device for measuring the electrical power consumption of a screwdriver drive.

3. The apparatus in accordance with claim 1, wherein one or more of the determination device, the evaluation unit, and the control device are integrated in the screwdriver unit.

4. The apparatus in accordance with claim 1, wherein one or both of the determination device and the evaluation unit are part of an external electronic computer device to which the screwdriver unit is connectable.

5. The apparatus in accordance with claim 1, wherein one or both of the determination device and the evaluation unit are connectable to a memory device in which torque/angle of rotation developments from previous tightening processes are stored; and
   wherein the maximum permitted change of the increase of the torque and/or the maximum permitted change speed of the increase of the torque is fixed with reference to the torque/angle of rotation developments stored in the memory.

6. The apparatus in accordance with claim 1, wherein the determination means comprises a pressure sensor and a volume flow meter for measuring a pressure and a volume flow of a hydraulic screwdriver drive.

7. The apparatus in accordance with claim 1, wherein one or more of the determination device, the evaluation unit, and the control device form components of an electronic control device that is provided in the screwdriver unit.

8. An apparatus for tightening a screw connection comprising:
   a motor-driven screwdriver unit;
   determination means for determining the torque (M) and the angle of rotation (cp) during the tightening of the screw connection;
   a determination device:
      for determining in a first tightening region, one or both of:
         an at least approximately constant rate of increase of the torque (M) over the angle of rotation (φ); and
         a change of the at least approximately constant rate of torque (M) increase over the angle of rotation (w); and
      for determining:
         if the at least approximately constant rate of increase of the torque over the angle of rotation is determined, a change of the at least approximately constant rate of increase in the torque over the angle of rotation: and
         if the at least approximately constant rate of change of the torque increase over the angle of rotation is determined, a change speed of the at least approximately constant rate of increase of the torque over the angle of rotation;
   an evaluation unit for fixing:
      if the change of the at least approximately constant rate of increase in the torque over the angle of rotation is determined, a maximum permitted change of the increase of the torque; and if the change speed of the at least approximately constant rate of increase of the torque over the angle of rotation is determined, a maximum permitted change speed of the increase of the torque; and a control device to, if the maximum permitted change speed of the increase of the torque is fixed, stop the screwdriver unit on reaching and/or exceeding the maximum permitted change speed of the increase of the torque;

wherein the first tightening region is fixed with reference to one or more of:
  a torque amount;
  if determined, the at least approximately constant rate of increase of the torque over the angle of rotation; and
  if determined, the at least approximately constant rate of change of the torque increase over the angle of rotation;
as an elastic tightening region in which the screw connection is elastically deformed.

9. A method of tightening a screw connection with a motor-driven screwdriver unit in which an angle of rotation and torque are determined during the tightening comprising:
  determining in a first tightening region a first change;
  determining in a second, following tightening region a second change; and
  stopping the screwdriver unit on reaching or exceeding a maximum permitted change;
  wherein:
    the maximum permitted change is based on the determined first change and the determined second change;
    the first change is selected from the group consisting of:
      an at least approximately constant rate of increase of the torque over the angle of rotation;
      a change of the at least approximately constant rate of torque increase over the angle of rotation; and
      a combination thereof;
    the second change is a change speed of the at least approximately constant rate of increase of the torque over the angle of rotation;
    the maximum permitted change is selected from the group consisting of:
      a maximum permitted change of the at least approximately constant rate of increase of the torque;
      a maximum permitted change speed of the at least approximately constant rate of increase of the torque; and
      a combination thereof;
    the first tightening region is fixed with reference to one or more of a torque amount, the at least approximately constant rate of increase of the torque over the angle of rotation, and the change of the at least approximately constant torque increase over the angle of rotation, as an elastic tightening region in which the screw connection is elastically deformed; and
    one or both of the maximum permitted change of the at least approximately constant rate of increase of the torque and the maximum permitted change speed of the at least approximately constant rate of increase of the torque is fixed such that the screw connection is preloaded to a yield point.

10. The method in accordance with claim 9, wherein one or both of the maximum permitted changes of the at least approximately constant rate of increase of the torque and the maximum permitted change speeds of the at least approximately constant rate of increase of the torque determined in previous screw connection processes are taken into account for the determination of either or both the maximum permitted change of the at least approximately constant rate of increase of the torque and the maximum permitted change speed of the at least approximately constant rate of increase of the torque.

11. The method in accordance with claim 9, wherein one or both the at least approximately constant rate of increase of the torque over the angle of rotation and the change of the at least approximately constant rate of torque increase over the angle of rotation determined in previous screw connection processes are taken into account for the determination of the maximum permitted change.

12. A method of tightening a screw connection with a motor-driven screwdriver unit in which an angle of rotation and torque are determined during the tightening comprising:
  determining, by a determination device, a first change;
  determining, by the determination device, a second change; and
  stopping, by a control device, the screwdriver unit on reaching or exceeding a maximum permitted change;
  wherein:
    the maximum permitted change is based on the determined first change and the determined second change;
    the first change is selected from the group consisting of:
      an at least approximately constant rate of increase of the torque over the angle of rotation;
      a change of the at least approximately constant rate of torque increase over the angle of rotation; and
      a combination thereof; and
    the second change is a change speed of the at least approximately constant rate of increase of the torque over the angle of rotation.

13. The method in accordance with claim 12, wherein the maximum permitted change is selected from the group consisting of a maximum permitted change of the at least approximately constant rate of increase of the torque, a maximum permitted change speed of the at least approximately constant rate of increase of the torque, and a combination thereof.

14. The method in accordance with claim 13, wherein one or both the maximum permitted change of the at least approximately constant rate of increase of the torque and the maximum permitted change speed of the at least approximately constant rate of increase of the torque is fixed such that the screw connection is preloaded to a yield point.

15. The method in accordance with claim 13, wherein:
  the determination device:
    in a first tightening region determines the first change; and
    in a second, following tightening region determines the second change; and
  the second change further comprises a change of the increase in the torque over the angle of rotation.

16. The method in accordance with claim 15, wherein the first tightening region is fixed with reference to one or more of a torque amount, the increase of the torque over the angle of rotation, and the change of the torque increase over the angle of rotation, as an elastic tightening region in which the screw connection is elastically deformed.

17. The method in accordance with claim 15, wherein one or both the increase of the torque over the angle of rotation and the change of the torque increase over the angle of rotation determined in previous screw connection processes are taken into account for the determination of either or both the maximum permitted change of the at least approximately constant rate of increase of the torque and the maximum permitted change speed of the at least approximately constant rate of increase of the torque.

* * * * *